United States Patent [19]
Devilliers et al.

[11] Patent Number: 5,882,054
[45] Date of Patent: Mar. 16, 1999

[54] DEVICE FOR PRECISE POSITIONING OF A VEHICLE BODY PART RELATIVE TO ANOTHER BODY PART

[75] Inventors: Olivier Devilliers; Bruno Ghiringhelli, both of Langres, France

[73] Assignee: Compagnie Plastic Omnium, Lyons, France

[21] Appl. No.: 582,504

[22] Filed: Jan. 3, 1996

[30] Foreign Application Priority Data

Jan. 3, 1995 [FR] France .................................. 95 00022

[51] Int. Cl.$^6$ ..................................................... B60R 19/24
[52] U.S. Cl. ............................................................. 293/155
[58] Field of Search .................................. 293/102, 149, 293/151, 152, 154, 155; 29/428

[56] References Cited

U.S. PATENT DOCUMENTS 5,108,138  4/1992  Kawaguchi ........................... 293/155 X
5,378,031  1/1995  Ohno et al. .............................. 293/102

FOREIGN PATENT DOCUMENTS 459849  12/1991  European Pat. Off. .
601937   6/1994  European Pat. Off. .
4332286  4/1994  Germany .

*Primary Examiner*—Andrew C. Pike
*Attorney, Agent, or Firm*—Oliff & Berridge, PLC

[57] ABSTRACT

A device allows precise positioning of a second body part relative to a first body part. The first part includes a first pair of reference surfaces, a second pair of reference surfaces not parallel to the surfaces of the first pair, and an abutting surface. The second part includes a first pair of bearing surfaces, a second pair of bearing surfaces, each pair of bearing surfaces being arranged to enable each of the surfaces to come into surface contact with a corresponding reference surface and slide along the bearing surface upon installation of the second part on the first part, and an abutting surface encountering the abutting surface of the first part when the second part is installed on the first part.

16 Claims, 4 Drawing Sheets

FIG_1

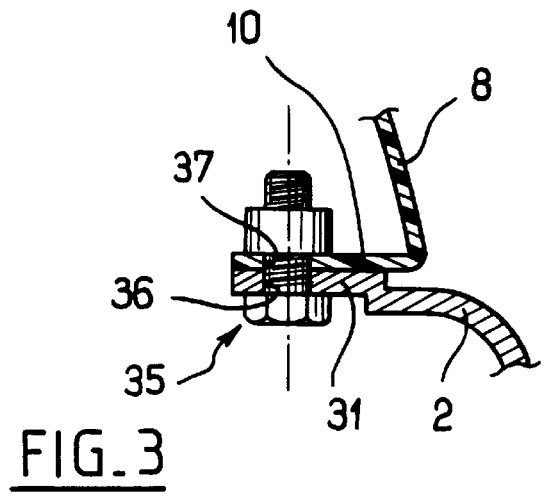
FIG. 3
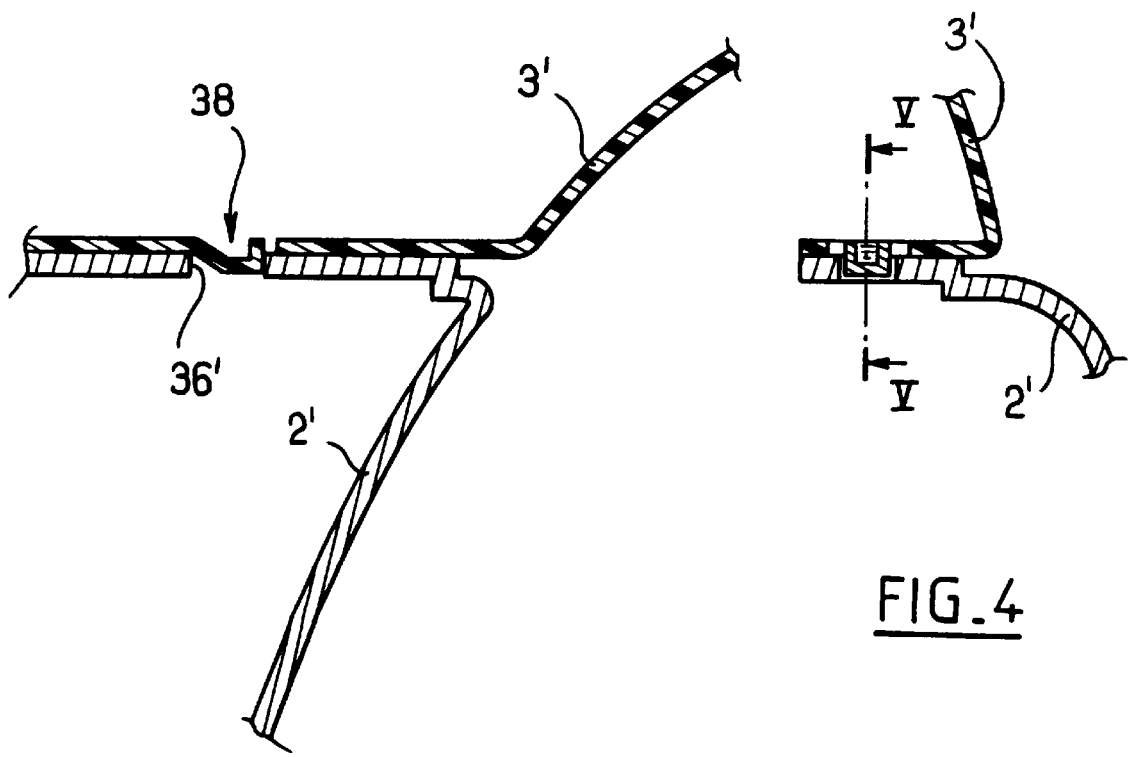
FIG. 5
FIG. 4

DEVICE FOR PRECISE POSITIONING OF A VEHICLE BODY PART RELATIVE TO ANOTHER BODY PART

FIELD OF THE INVENTION

The present invention relates to a device for precise positioning, or alignment, of a vehicle body part relative to another body part, for example of a bumper on a fender.

BACKGROUND OF THE INVENTION

An automotive vehicle bumper generally has two types of mounts.

First, in the front part of the bumper, one or more mounts known as main mounts attach the bumper to the chassis and body of the vehicle.

Second, in the side parts or wings of the bumper, mounts known as secondary mounts connect the bumper to the fenders.

These secondary mounts essentially have the function of preventing vertical play of the bumper and allowing alignment, or precise positioning, of the bumper relative to the fenders.

This precise positioning, which must take place in three dimensions, is particularly important with today's vehicle bodies which integrate a body and a bumper assembly comprising a part forming a rocker panel and a part forming a bumper. In this type of body, the aim is to conceal the boundary between the body and the bumper assembly, ensuring continuity of shape and color between these two parts.

Hence it is essential for the bumper assembly to be precisely positioned relative to the body, particularly for the wings of the bumper assembly, namely the side parts designed to wrap around the corners of the body, to be adjusted relative to the fenders.

In the prior art, the secondary mounts use built-in mounting elements, which have a number of disadvantages.

First, to make these mounting elements, it is necessary to use special tools.

Also, the mounting and assembling of the various mounting elements take a great deal of labor and make it difficult to automate the mounting of the bumper.

Moreover, the presence of intermediate mounting elements favors generation of noise and impairs precise alignment of the bumper because of the added size tolerances.

Another problem arises when the bumper is made of plastic, because in this case it is necessary to make ribs inside the bumper to allow it to be attached by means of the intermediate mounting elements. Yet such ribs cause cavities in the outer visible part of the bumper.

The main goal of the present invention is to avoid these disadvantages by offering a simple, economical device able to constitute a secondary mount ensuring precise alignment of the bumper relative to the fenders and, in general, precise positioning relative to a body part of any other body part requiring safe, precise retention in a given position.

SUMMARY OF THE INVENTION

The present invention relates to a device for precise positioning, relative to a first body part, of a second body part, comprising:
 (a) on the first part:
  a first pair of reference surfaces parallel to each other and parallel to a given direction,
  a second pair of reference surfaces, also parallel to each other and parallel to the given direction, but not parallel to the surfaces of the first pair, and
  an abutting surface substantially perpendicular to the given direction; and
 (b) on the second part:
  a first pair of bearing surfaces parallel to each other and parallel to said given direction,
  a second pair of bearing surfaces also parallel to each other and parallel to the given direction, each pair of bearing surfaces being arranged such that each of the surfaces comes into surface contact with a corresponding reference surface and slides along it upon installation, by translation along the given direction of the second part on the first part, and
  an abutting surface encountering the abutting surface of the first part when the second part is installed on the first part.

According to the invention, the reference surfaces and the corresponding bearing surfaces ensure alignment of the two parts in two directions that are not parallel to each other and not parallel to the given direction, while the surface and the abutting surface ensure correct positioning of the two parts in the given direction, which corresponds to the installation direction of the second part.

BRIEF DESCRIPTION OF THE DRAWINGS

For better understanding of the invention, one embodiment provided as a nonlimiting example will now be described with reference to the attached drawings wherein:

FIG. 3 is a section along line III—III in FIG. 2, FIG. 4 is a view similar to FIG. 3 illustrating one variant of one type of mount, FIG. 5 is a section along line V—V in FIG. 4.

DESCRIPTION OF PREFERRED EMBODIMENTS

Advantageously, the surfaces and bearing surfaces of each first respective pair are perpendicular to the surfaces and bearing surfaces of each second respective pair.

In a preferred embodiment of the invention, the bearing surfaces of one and the same pair are constituted by the two opposite faces of a wall of constant thickness of the second part.

In a preferred variant of this embodiment, this constant-thickness wall also has two lateral shoulders directed perpendicularly to its two faces, the shoulders forming a second pair of bearing surfaces in the sense of the invention.

In a preferred embodiment of the invention, the first part has guide surfaces located upstream of the reference surfaces in the given direction.

In a preferred embodiment of the invention, mounting means are provided between the two parts to prevent backward movement of the second part after it has been installed on the first part.

These mounting means can be constituted by a latching system, bolts, or any other appropriate means.

It will be understood that, because of the invention, it is unnecessary to resort to intermediate mounting elements between the two parts since the bearing surfaces and the reference surfaces and the supports and abutting surface are made such as to ensure directly the correct and precise positioning of the two parts.

In addition, since the part is engaged by translation in the given direction, it is particularly easy to automate the operation of installing the second part on the first part, which operation does not require very substantial precision in maneuvering because the bearing surfaces and the reference surfaces and the supports and abutting surface ensure by themselves correct positioning of the second part relative to the first part.

Figure 1:
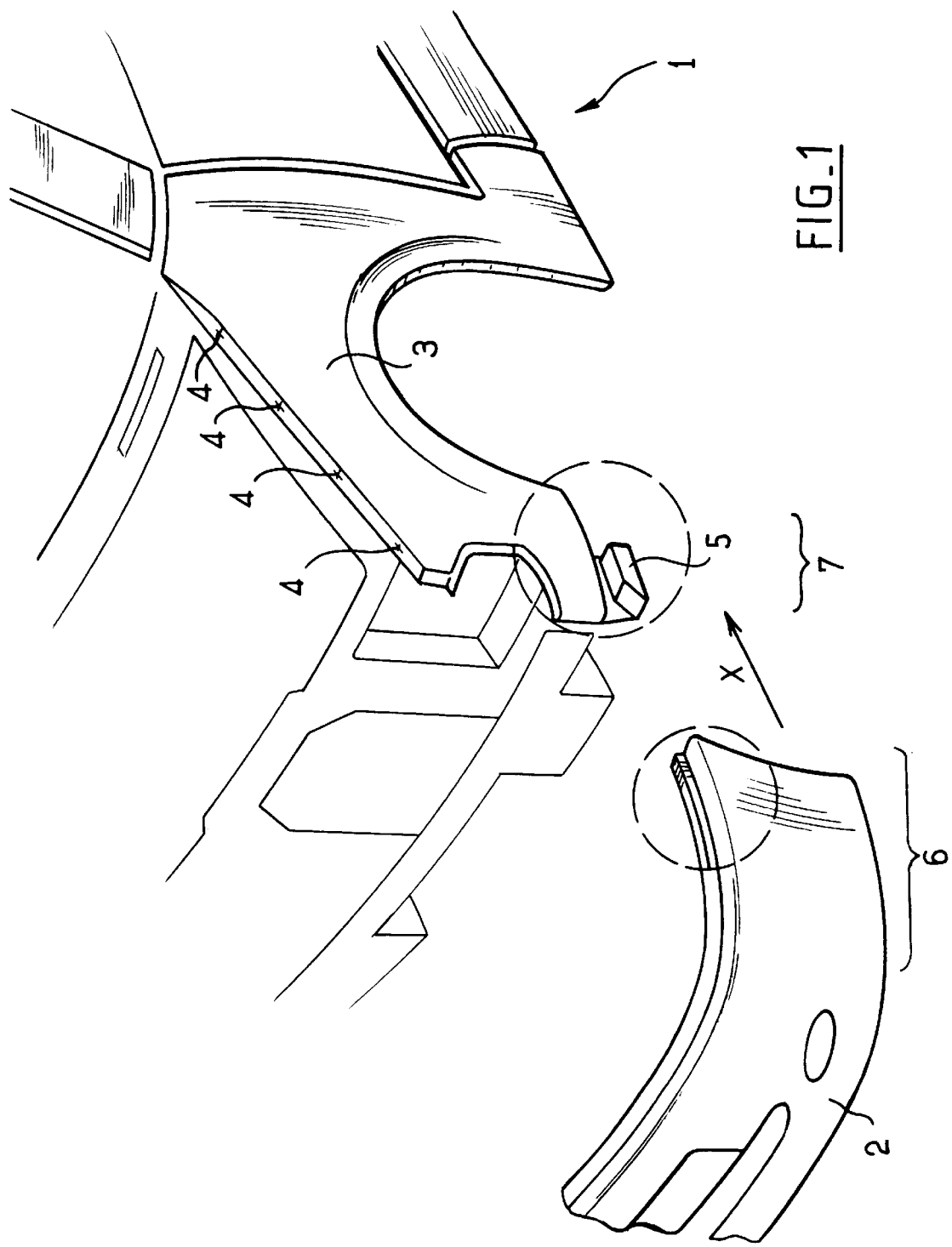
FIG. 1 is a schematic perspective view of the front left part of an automotive vehicle.

FIG. 1 shows the front left part of an automotive vehicle 1 and the corresponding part of a bumper 2.

The front left fender 3 of vehicle 1 is attached to the body by various mounts, particularly those indicated by crosses 4.

At its front part, fender 3 has a part 5 which is preferably cast in the case of a fender made of plastic.

Bumper 2 is of the type having side parts or wings 6 which wrap around the corners of the body and engage below front part 7 of each front fender 3 of the vehicle.

Bumper 2 is designed to be installed in given direction X.

According to the invention, fender 3 is a first body part and bumper 2 is a second body part.

Figure 2:
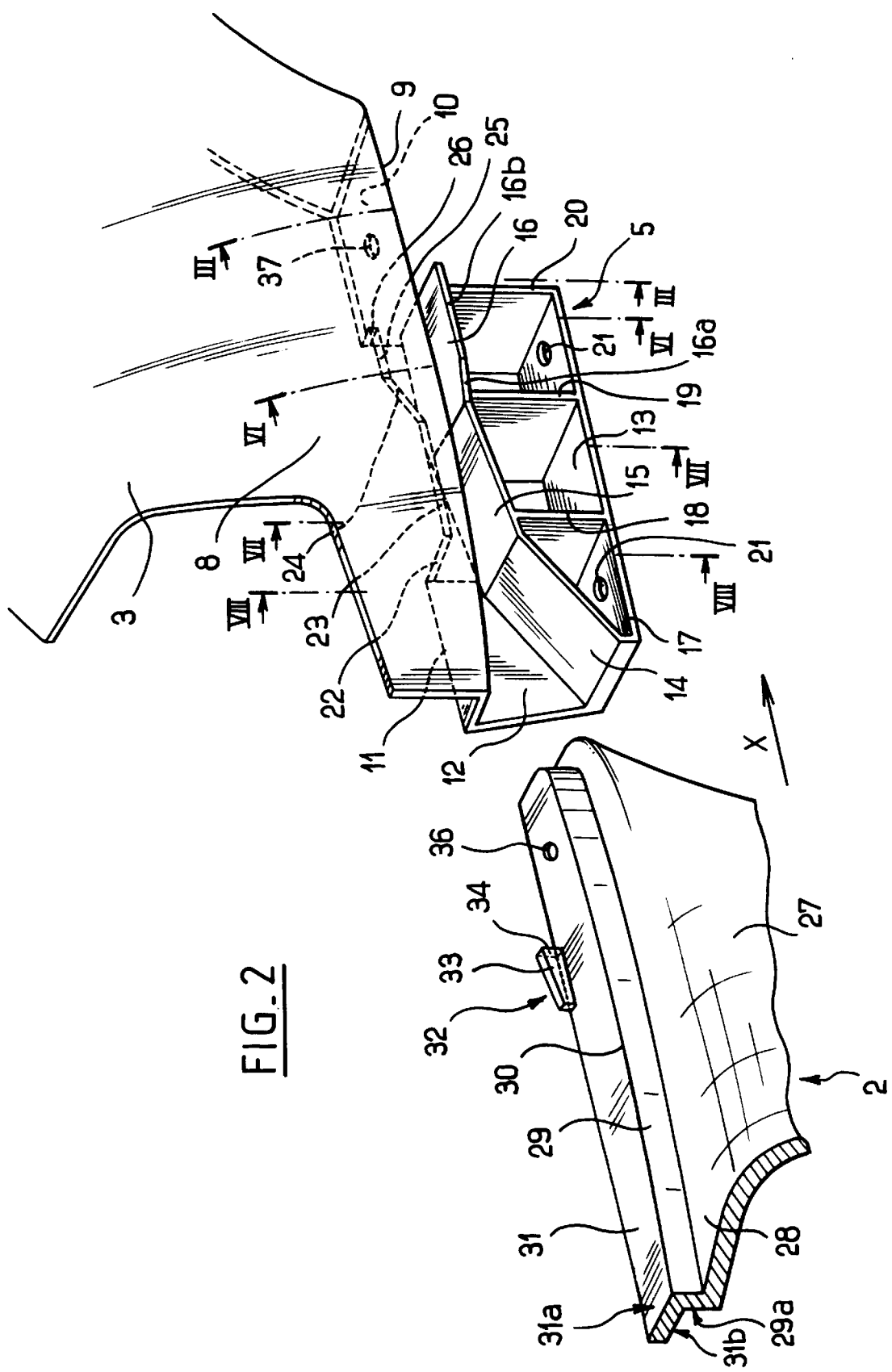
FIG. 2 is a view on a larger scale of part of FIG. 1.

Detailed views on a larger scale of the parts delimited by dashed circles of the bumper and the fender are shown in FIG. 2.

This FIG. 2 shows part 5 which is an integral part of fender 3.

The hidden edges of the fender are shown in dashed lines. These edges comprise a side wall 8 visible from the outside, which extends up to a first edge 9 where a second and substantially horizontal wall 10 extends up to a second edge 11. Wall 10 is hollow in its central part in the vicinity of this second edge 11.

A third wall 12, substantially vertical, extends from second edge 11 to part 5.

The latter is comprised of a lower substantially horizontal wall 13 and an upper wall divided into three portions 14, 15, 16 of decreasing inclination from the front to the rear of the vehicle.

The first wall portion 14 has, relative to the horizontal, an inclination of about 45°, the second, 15, an inclination of approximately 10°, and the third, 16, is substantially horizontal, namely it is parallel to the horizontal face 10 of fender 3.

The third wall portion 16 has a width that increases from the second portion of wall 15 to approximately the first third of its length. Because of this, in its first third, the wall portion 16 has an edge 16a inclined outward relative to direction X, while in the rear two-thirds of the wall portion 16, edge 16b is parallel to direction X.

Between upper walls 14, 15, 16 and lower wall 13 of part 5 extend four vertical partitions 17, 18, 19, 20.

Lower wall 13 of part 5 has two holes 21 which constitute two additional mounting points of fender 3 onto the vehicle body.

Horizontal wall 10 of fender 3 has, from the front to the rear of the vehicle, a first segment 22 that is substantially perpendicular to direction X, a second segment 23 that is substantially parallel to direction X, a third segment 24 that is inclined toward the inside of the vehicle by approximately 45° relative to direction X, a fourth segment 25 substantially parallel to direction X, and a fifth segment 26 perpendicular to direction X.

Additionally, bumper 2 has a side wall 27 visible from the outside, whose rounded upper part 28 ends substantially horizontally.

A first substantially vertical shoulder 29 extends up to an edge 30 from which a substantially horizontal wall 31 of constant thickness extends toward the inside of the bumper.

The width of horizontal wall 31 is substantially equal to that of part 5. A second vertical shoulder 32 projects from horizontal wall 31 opposite first shoulder 29.

This second shoulder 32 has an outside face 33 that is substantially vertical and a rear face 34 forming a stop in direction X.

As defined by the invention, horizontal wall 10 of fender 3 and the horizontal wall portion 16 of part 5 constitute a first pair of reference surfaces.

Likewise, segment 25 of the horizontal wall 10 of fender 3 and the rear edge 16b of horizontal wall portion 16 of part 5 form a second pair of reference surfaces as defined by the invention.

Segment 26 constitutes an abutting surface according to the invention.

On bumper 2, a first pair of bearing surfaces is constituted by two faces, upper face 31a and lower face 31b, of horizontal wall 31. A second pair of bearing surfaces is constituted by outer face 33 of shoulder 32 and inner face 29a of vertical shoulder 29, while the rear face 34 of shoulder 32 constitutes an abutting surface.

In the embodiment shown, fender 3 has guide surfaces upstream of the reference surfaces. These guide surfaces are constituted by inclined wall portions 14 and 15 of part 5, by segment 24 cut slantwise in horizontal wall 10, and by edge 16a of horizontal wall portion 16.

When bumper 2 is assembled to fender 3, by translation in direction X, the lower face 31b of horizontal wall 31 of the bumper is first supported on the first inclined wall portion 14, then on the second inclined wall portion 15, and finally on horizontal wall portion 16.

Simultaneously, inner face 29a of vertical shoulder 29 of the bumper and outer face 33 of shoulder 32 are supported on edge 16a and segment 24, and are then guided up to edge 16b and segment 25.

The movement of the bumper along direction X continues until the rear face 34 of shoulder 32 is supported against segment 26.

Figure 6:
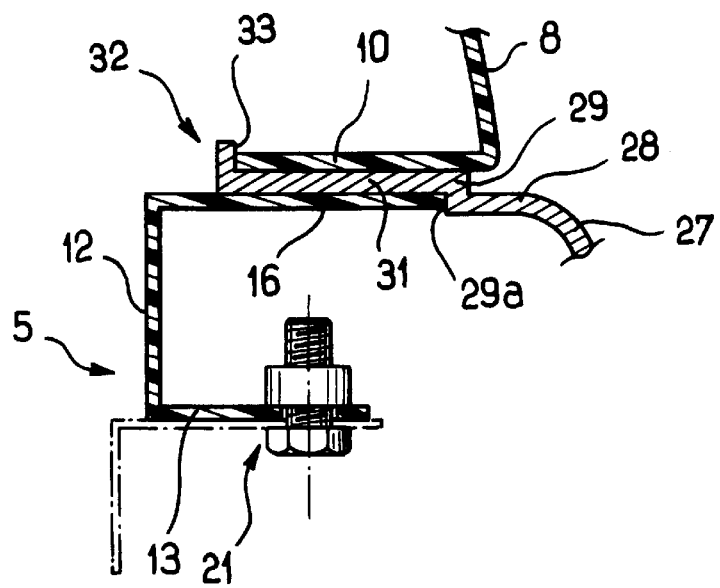
FIG. 6 is a section along line VI—VI in FIG. 2.
Figure 7:
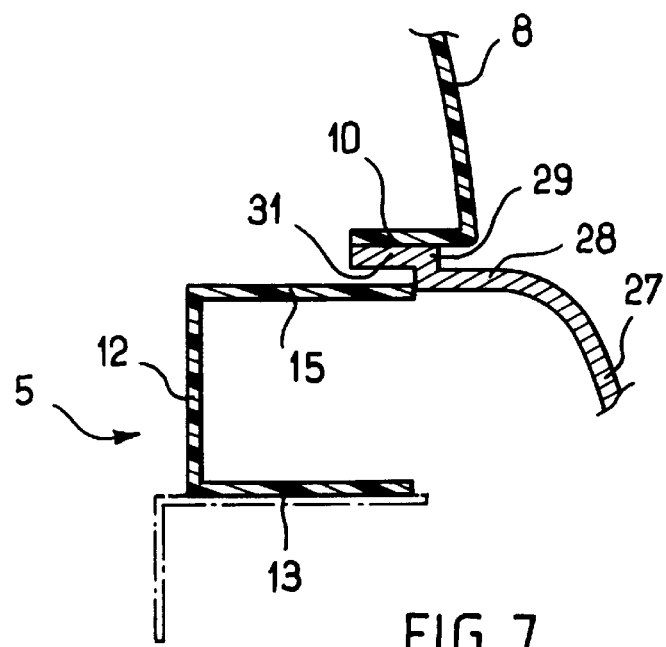
FIG. 7 is a section along line VII—VII in FIG. 2.
Figure 8:
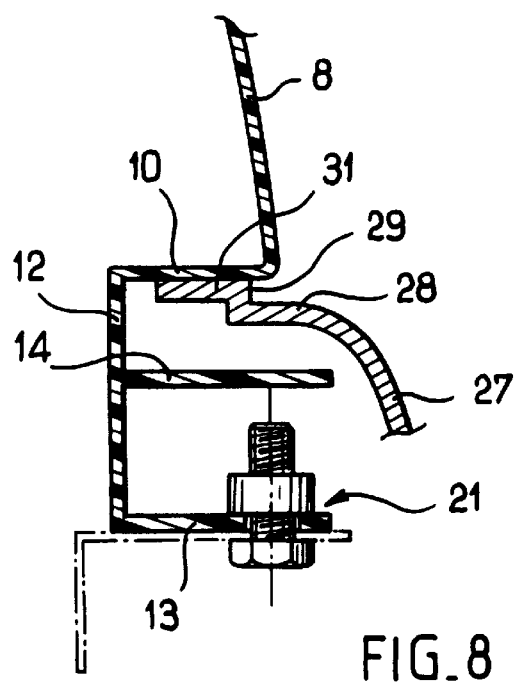
FIG. 8 is a section along line VIII—VIII in FIG. 2.

In the assembled position, horizontal wall 31 of the bumper is held between the two reference surface pairs, as can be seen in the section of FIG. 6.

The bumper can be held in position relative to the fender by a bolt 35 passing through a hole 36 in the bumper and a hole 37 in the fender which are opposite each other, as can be seen in the section of FIG. 3.

In one variant shown in FIGS. 4 and 5, fender 3' has a tongue 38 able to engage hole 36' in bumper 2' to hold the latter in position.

It can be seen that, because of the reference surfaces, the bearing surfaces, and the abutting surfaces and bearing surfaces, precise alignment of the bumper relative to the fender is ensured.

In addition, the presence of guide surfaces allows the bumper to be lined up relatively imprecisely in front of the vehicle.

This advantage allows, in particular, installation of the bumper to be automated.

It is evident that the embodiment just described is not limiting and could receive any desirable modifications without thereby departing from the framework of the invention.

In particular, the invention can be implemented to align any body parts of a vehicle, for example to position a spoiler, a vent window, or a trim strip.

What is claimed is:

1. A system for precise positioning of body parts, the system comprising:
   (a) a first body part comprising:
      a first pair of reference surfaces parallel to each other and parallel to a given direction,
      a second pair of reference surfaces, also parallel to each other and parallel to said given direction, but not parallel to the first pair of reference surfaces,
      a first abutting surface substantially perpendicular to said given direction; and
   (b) a second body part comprising:
      a first pair of bearing surfaces parallel to each other and parallel to said given direction,
      a second pair of bearing surfaces also parallel to each other and parallel to said given direction, each pair of bearing surfaces being arranged to enable each of said bearing surfaces to come into surface contact with a corresponding said reference surface, and slide along said corresponding reference surface upon installation by translation along said given direction of said second body part on said first body part, and
      a second abutting surface encountering said first abutting surface of said first body part when said second body part is installed on said first body part,
      wherein said first pair of bearing surfaces of said second part comprises two opposite faces of a wall of constant width.

2. A system according to claim 1, wherein said wall of constant width comprises two lateral shoulders directed perpendicularly to said two opposite faces of said wall of constant width, said shoulders forming said second pair of bearing surfaces.

3. A system according to claim 1, wherein said first body part further comprises guide surfaces located upstream of said first and second pairs of reference surfaces in said given direction.

4. A system according to claim 1, further comprising mounting means between said first body part and said second body part to prevent backward movement of said second body part once said second body part has been installed on said first body part.

5. A system according to claim 4, wherein said mounting means comprises a latching system.

6. A system according to claim 1, wherein said second body part comprises a bumper and said first body part comprises a fender.

7. A system according to claim 6, wherein said second body part comprises a side part of the bumper.

8. A system according to claim 7, wherein the reference and bearing surfaces are located in a continuation of outer visible surfaces of the bumper and of the fender.

9. A device for precise positioning of a second body part relative to a first body part, the device comprising:
   (a) a first coupling part integral with said first body part comprising:
      a first pair of reference surfaces parallel to each other and parallel to a given direction,
      a second pair of reference surfaces also parallel to each other and parallel to said given direction, but not parallel to the reference surfaces of the first pair, and
      a first abutting surface substantially perpendicular to said given direction; and
   (b) a second coupling part integral with said second body part comprising:
      a first pair of bearing surfaces parallel to each other and parallel to said given direction,
      a second pair of bearing surfaces also parallel to each other and parallel to said given direction, each pair of bearing surfaces being arranged to enable each of said bearing surfaces to come into surface contact with a corresponding said reference surface and slide along said corresponding reference surface upon installation by translation along said given direction of said second body part on said first body part, and
      a second abutting surface encountering said first abutting surface of said first body part when said second body part is installed on said first body part,
      wherein said first pair of bearing surfaces of said second coupling part comprises two opposite faces of a wall of constant width.

10. A device according to claim 9, wherein said wall of constant width comprises two lateral shoulders directed perpendicularly to said two opposite faces of said wall of constant width, said shoulders forming said second pair of bearing surfaces.

11. A device according to claim 9, wherein said second body part comprises a bumper and said first body part comprises a fender.

12. A device according to claim 11, wherein said second body part comprises a side part of the bumper.

13. A device according to claim 12, wherein the reference and bearing surfaces are located in a continuation of outer visible surfaces of the bumper and of the fender.

14. A device according to claim 12, further comprising mounting means between said first body part and said second body part to prevent backward movement of said second body part once said second body part has been installed on said first body part.

15. A device according to claim 14, wherein said mounting means comprises a latching system.

16. A device according to claim 9, wherein said first body part further comprises guide surfaces located upstream of said first and second pairs of reference surfaces in said given direction.

* * * * *